(12) United States Patent
Saliya et al.

(10) Patent No.: US 9,540,533 B2
(45) Date of Patent: Jan. 10, 2017

(54) SOLVENT BORNE COATING COMPOSITION HAVING IMPROVED SAG RESISTANCE AND PROCESS FOR PRODUCING COATINGS THEREFROM

(71) Applicant: AXALTA COATING SYSTEMS IP CO., LLC, Wilmington, DE (US)

(72) Inventors: Rajesh Gopalan Saliya, Wilmington, DE (US); Ayumu Yokoyama, Media, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 237 days.

(21) Appl. No.: 14/466,471

(22) Filed: Aug. 22, 2014

(65) Prior Publication Data
US 2015/0056375 A1    Feb. 26, 2015

Related U.S. Application Data

(60) Provisional application No. 61/869,252, filed on Aug. 23, 2013.

(51) Int. Cl.
| C08L 91/00 | (2006.01) |
| C09D 133/06 | (2006.01) |
| C09D 133/12 | (2006.01) |
| C09D 191/00 | (2006.01) |

(52) U.S. Cl.
CPC ........... *C09D 133/12* (2013.01); *C08L 91/005* (2013.01); *C09D 133/066* (2013.01); *C09D 191/005* (2013.01)

(58) Field of Classification Search
CPC .............. C09D 133/12; C09D 133/066; C09D 191/005; C08L 91/005
See application file for complete search history.

(56) References Cited

U.S. PATENT DOCUMENTS

| 3,547,848 | A | * | 12/1970 | Marsh | ....................... | C09D 5/04 106/218 |
| 3,893,956 | A |  | 7/1975 | Brandt | | |
| 4,591,533 | A |  | 5/1986 | Antonelli et al. | | |
| 5,010,140 | A |  | 4/1991 | Antonelli et al. | | |
| 5,637,403 | A |  | 6/1997 | Kuwamura et al. | | |
| 5,763,528 | A |  | 6/1998 | Barsotti et al. | | |
| 6,037,404 | A | * | 3/2000 | Dahm | ................. | C08G 18/4072 524/590 |
| 2006/0155021 | A1 |  | 7/2006 | Lenges et al. | | |
| 2010/0004365 | A1 |  | 1/2010 | Saliya et al. | | |

FOREIGN PATENT DOCUMENTS

| EP | 35666 | * | 9/1981 |
| WO | 2011037818 A1 | | 3/2011 |

OTHER PUBLICATIONS

English Abstract of EP 35666, Zueckert, Sep. 1981.*
ISA European Patent Office, International Preliminary Report on Patentability for Application No. PCT/US2014/052280, dated Mar. 3, 2016.
ISA European Patent Office, International Search Report and Written Opinion for Application No. PCT/US2014/052280, dated Dec. 10, 2014.

* cited by examiner

Primary Examiner — Patrick Niland
(74) Attorney, Agent, or Firm — Lorenz & Kopf LLP

(57) ABSTRACT

A solvent borne brushable coating composition having improved sag resistance and process for using the same are provided. The composition includes a crosslinkable component having one or more polymers having two or more crosslinkable groups a crosslinking component comprising one or more crosslinking agents having crosslinking groups; and a sag control agent of polyurea in drying oil. When a layer a pot mix resulting from mixing of the crosslinkable and crosslinking components is brush applied over a substrate, it has high sag resistance, low brush drag while providing desired coating properties, such as high gloss and rapid cure even under ambient conditions. The solvent borne brushable coating compositions is well suited for use in automotive refinish applications as well as direct-to-metal industrial applications, such as construction and transportation equipment.

19 Claims, No Drawings

SOLVENT BORNE COATING COMPOSITION HAVING IMPROVED SAG RESISTANCE AND PROCESS FOR PRODUCING COATINGS THEREFROM

CROSS-REFERENCE TO RELATED APPLICATION

This application claims priority to U.S. Provisional Patent Application No. 61/869,252, filed Aug. 23, 2013, which is incorporated herein by reference in its entirety.

TECHNICAL FIELD

The technical field is directed to a solvent borne coating composition having improved sag resistance and brushability and more particularly directed to solvent borne industrial brushable paint having low VOC that produces high gloss coatings on substrates such as, automotive bodies, construction equipment and transportation structures, such as bridges and towers, preferably direct-to-metal surfaces (bare metal surfaces free from coatings, such as primers).

BACKGROUND

Brushability is the ability of paint to be easily and uniformly applied to a surface using a paint brush. Brushability is adversely affected as a result of brushmarks (striations) that do not flow out, sagging, high brush drag that makes brushing difficult, and low brush drag that makes brushing so easy that overspreading of the paint occurs. Other defects such as cratering or uneven coating thickness can also occur. Lap marks will occur if the paint formulation or the way that it is being applied will not allow a wet edge to be maintained, i.e., there would be a difference in the gloss between dried layer and next abutting wet layer being brushed. Brush drag, a measure of the ease or difficulty of the brushing action, is a major factor in brushability. High brush drag helps produce high film thickness, but can make brushing so difficult that the painter can easily get tired of applying paint. Low brush drag means that the paint may be easy to apply, but then would result in an application thin uneven coating with poor hiding. The brushability of two-pack cure coating compositions, i.e., enamels, is even more difficult to achieve since it is difficult to control premature curing of a pot mix on paint bristles as well as different parts of bristles containing pot mix that have been exposed to the paint.

Moreover, another key aspect of brushable coating composition is its sag resistance. Layers of coating compositions over slanted or vertical substrate surfaces tend to sag when first applied. The thickness of the layer applied, component contents in the composition as well as its viscosity do affect the overall sagging of the applied layer. The lesser the sag, the better is the sag resistance of the applied layer. Thus, a need still exists for a brushable solvent borne ambient cure enamel that has low brush drag, low VOC, desired coating properties, such as gloss but one that also has improved sag resistance.

In the past, Kaolin has been used to improve the brushability of two pack coating compositions, such as enamels. However, the presence of Kaolin could affect the coating properties of a coating when exposed to environmental damage such as abrasion from dirt and grime on the road and cracking. Thus, a need exists to improve the brushablity of a coating composition having improved sag resistance of a layer resulting therefrom, especially for ambient cure automotive paint used in refinish applications.

SUMMARY

An exemplary embodiment provides a solvent borne brushable coating composition having improved sag resistance, said composition comprising:

(a) a crosslinkable component comprising one or more polymers having two or more crosslinkable groups;

(b) a crosslinking component comprising one or more crosslinking agents having crosslinking groups; and (c) a sag control agent prepared by polymerizing a mixture comprising one or more amine monomers, one or more isocyanate monomers and a drying oil comprising selected from the group consisting of linseed oil, tung oil, poppy seed oil, perilla oil, walnut oil or a combination thereof;

wherein said sag control agent is added to said crosslinkable component, crosslinking component, or to said crosslinkable and crosslinking components.

Another exemplary embodiment is also directed to a process for producing a coating on a substrate comprising:

(a) mixing a crosslinkable component of a solvent borne brushable coating composition having improved sag resistance with a crosslinking component of said composition to form a pot mix, wherein said crosslinkable component comprises one or more polymers having two or more crosslinkable groups and wherein said crosslinking component comprises one or more crosslinking agents having crosslinking groups; and wherein said composition further comprises a sag control agent prepared by polymerizing a mixture comprising one or more amine monomers, one or more isocyanate monomers and a drying oil comprising selected from the group consisting of linseed oil, tung oil, poppy seed oil, perilla oil, walnut oil or a combination thereof;

(b) brushing a layer of said pot mix over said substrate, wherein said pot mix has a sag resistance in the range of from 5 to 20 mils (127 to 508 micrometers) under ASTM test D4400-99; and (c) curing said layer under ambient conditions to form a coating on said substrate.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "two-pack coating composition", also known as 2K coating composition, refers to a coating composition having two components (crosslinkable and crosslinking components) that are stored in separate containers and hermitically sealed to increase the shelf life of the components of the coating composition during storage and also to prevent exposure to air when stored. The components are mixed just prior to use to form a pot mix, which has a limited pot life, typically ranging from a few minutes (15 minutes to 45 minutes) to a few hours (4 hours to 8 hours). The pot mix is then applied using a brush as a layer of a desired thickness on a substrate surface, such as an automobile body. After application, the layer dries and cures under ambient conditions to form a coating on the substrate surface having desired coating properties, such as, high gloss, mar-resistance and resistance to environmental etching.

The term "crosslinkable component" refers to a component that includes polymers having "crosslinkable functional groups" that are functional groups positioned in each molecule of compounds, oligomer, polymer, the backbone of the polymer, pendant from the backbone of the polymer, terminally positioned on the backbone of the polymer, or a combination thereof, wherein these functional groups are capable of crosslinking with the crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups defined below. A workable combination of crosslinkable functional groups refers to the combinations of crosslinkable functional groups that can be used in coating applications excluding those combinations that would self-crosslink.

Typical crosslinkable functional groups can be selected from hydroxyl, thiol, thioisocyanate, acid or polyacid, acetoacetoxy, carboxyl, primary amine, secondary amine, epoxy, anhydride, ketimine, aldimine, or a combination thereof. Some other functional groups such as orthoester, orther carbonate, or cyclic amide that can generate hydroxyl or amine groups, once the ring structure is opened, can also be suitable as crosslinkable functional groups. Hydroxyl groups are preferred.

The term "crosslinking component" refers to a component that includes crosslinking agents having "crosslinking functional groups" that are functional groups positioned in each molecule of monomer, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking group/crosslinkable functional group combinations would be excluded from the present invention, since they would fail to crosslink and produce the film forming crosslinked structures. The crosslinking component can comprise one or more crosslinking agents that have the crosslinking functional groups.

Typical crosslinking functional groups can be selected from the group consisting of hydroxyl, thiol, isocyanate, thioisocyanate, acid or polyacid, acetoacetoxy, carboxyl, primary amine, secondary amine, epoxy, anhydride, ketimine, aldimine, orthoester, orthocarbonate, cyclic amide or a combination thereof. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications.

It would be clear to one of ordinary skill in the art that certain crosslinking functional groups crosslink with certain crosslinkable functional groups. Examples of paired combinations of crosslinkable and crosslinking functional groups include: (1) ketimine functional groups generally crosslink with acetoacetoxy, epoxy, or anhydride functional groups; (2) isocyanate, thioisocyanate and melamine functional groups generally crosslink with hydroxyl, thiol, primary and secondary amine, ketimine, or aldimine functional groups; (3) epoxy functional groups generally crosslink with carboxyl, primary and secondary amine, ketimine, or anhydride functional groups; (4) amine functional groups generally crosslink with acetoacetoxy functional groups; (5) polyacid functional groups generally crosslink with epoxy or isocyanate functional groups; and (6) anhydride functional groups generally crosslink with epoxy and ketimine functional groups.

A substrate suitable for this invention can be a plastic, metal, such as steel, aluminum or other metal or alloys. The substrate can also be plastic or metal substrates with one or more existing coating layers. One example can be a steel substrate coated with an eletrocoat (e-coat) layer. Another example can be a steel substrate coated with an eletrocoat (e-coat) layer and a primer layer. Yet another example can be a steel substrate coated with a primer layer. Yet another example can be a steel substrate coated with a primer layer and a colored coating layer. The primer layer can be produced with an epoxy primer, an acrylic primer, a polyester primer, or other primers known to those skilled in the art. An epoxy primer means a primer composition comprises at least one epoxy resin or its derivatives. An acrylic primer means a primer composition comprises at least one acrylic resin or its derivatives. A polyester primer means a primer composition comprises polyesters or polyester derivatives.

One of the preferred embodiment crosslinkable component of the present invention can consist essentially of an acrylic polymer having pendant groups that are reactive with isocyanate moieties and having a glass transition temperature (Tg) of −40° C. to 60° C.

One of the preferred embodiments of a crosslinking component of the present invention can consist essentially of a crosslinking agent having one or more isocyanate functional groups that react with said crosslinkable functional groups in the aforedescribed acrylic polymer to form crosslinks.

The coating composition of the present invention can include a crosslinkable component consisting essentially of 10% to 80% by weight, preferably 20% to 70% by weight, of the acrylic polymer; and a crosslinking component consisting essentially of 10% to 50% by weight and preferably 10% to 45% by weight of organic polyisocyanate. All weight percentages are based on the total weight of the binder composition. Preferably, the novel composition has a molar ratio of NCO:OH of 0.8:1.0 to 1.5:1.0, preferably 0.9:1.0 to 1.1:1.0.

The acrylic polymer used in the composition has a weight average molecular weight (Mw) of about 2,000 to 100,000, and a glass transition temperature (Tg) in a range of from −40° C. to 60° C., preferably −10° C. to 30° C., and contains pendant moieties that are reactive with isocyanate groups, such as, hydroxyl, amino, amide, glycidyl, silane and carboxyl groups. The Tg can be measured via a Dynamic Mechanical Analyzer (DMA Q800 from TA Instruments, New Castle, Del.) using ASTM D7028 or the Tg can be calculated according to the Fox Equation. These acrylic polymers can be straight chain polymers, branched polymers, block copolymers, graft polymers, graft terpolymers and core shell polymers.

Preferably, the acrylic polymer can have a weight average molecular weight of 5,000 to 50,000, more preferably, 5,000 to 25,000 and a Tg in a range of from −40° C. to 60° C., preferably less than 10° C. Typically, useful acrylic polymers can be those known in the art and are polymers of the following: linear alkyl (meth)acrylates having 1 to 12 carbon atoms in the alkyl group, cyclic or branched alkyl (meth) acrylates having 3 to 12 carbon atoms in the alkyl group, including isobornyl (meth)acrylate and the polymers can contain styrene, alpha methyl styrene, vinyl toluene, (meth) acrylonitrile, (meth)acryl amides and contain monomers that provide pendant reactive groups, such as hydroxyalkyl (meth)acrylates having 1 to 4 carbon atoms in the alkyl group, glycidyl (meth)acrylate, amino alkyl (meth)acrylates having 1 to 4 carbon atoms in the alkyl group, (meth)acrylic acid, alkoxy silyl alkyl (meth)acrylates, such as trimethoxysilylpropyl (meth)acrylate.

Preferred are hydroxyl functional acrylic polymers having a hydroxyl equivalent weight (on a solids basis) of 300 to 800, preferably, 380 to 750 and more preferably, 450 to 580 and are polymers of hydroxyalkyl (meth)acrylates and one or more of the aforementioned monomers. The hydroxyl equivalent weight is the grams of resin per equivalent of hydroxyl groups.

Suitable hydroxyl-functional unsaturated monomers that can be used to introduce hydroxyl groups into the acrylic polymer are, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. Examples of suitable hydroxyalkyl esters of alpha,beta-olefinically unsaturated monocarboxylic acids with primary hydroxyl groups are hydroxyethyl (meth)acrylate, hydroxypropyl (meth)acrylate, hydroxybutyl (meth)acrylate, hydroxyamyl (meth)acrylate, hydroxyhexyl (meth)acrylate. Examples of suitable hydroxyalkyl esters with secondary hydroxyl groups are 2-hydroxypropyl (meth)acrylate, 2-hydroxybutyl (meth)acrylate, 3-hydroxybutyl (meth)acrylate.

Additional useful hydroxyl-functional unsaturated monomers are reaction products of alpha,beta-unsaturated monocarboxylic acids with glycidyl esters of saturated monocarboxylic acids branched in alpha position, for example with glycidyl esters of saturated alpha-alkylalkanemonocarboxylic acids or alpha,alpha'-dialkylalkanemonocarboxylic acids. These preferably comprise the reaction products of (meth)acrylic acid with glycidyl esters of saturated alpha, alpha-dialkylalkanemonocarboxylic acids with 7 to 13 carbon atoms per molecule, particularly preferably with 9 to 11 carbon atoms per molecule. These reaction products may be formed before, during or after the copolymerization reaction.

Further usable hydroxyl-functional unsaturated monomers are reaction products of hydroxyalkyl (meth)acrylates with lactones. Hydroxyalkyl (meth)acrylates which may be used are, for example, those stated above.

Suitable lactones are, for example, those that have 3 to 9 carbon atoms in the ring, wherein the rings may also comprise different substituents. Preferred lactones are gamma-butyrolactone, delta-valerolactone, epsilon-caprolactone, beta-hydroxy-beta-methyl-delta-valerolactone, lambda-laurolactone or mixtures thereof. Epsilon-caprolactone is particularly preferred. The reaction products preferably comprise those prepared from 1 mole of a hydroxyalkyl ester of an alpha,beta-unsaturated monocarboxylic acid and 1 to 5 moles, preferably on average 2 moles, of a lactone. The hydroxyl groups of the hydroxyalkyl esters may be modified with the lactone before, during or after the copolymerization reaction. Suitable unsaturated monomers that can be used to provide the acrylic polymer with glycidyl groups are, for example, allyl glycidyl ether, 3,4-epoxy-1-vinylcyclohexane, epoxycyclohexyl (meth)acrylate, vinyl glycidyl ether and glycidyl (meth)acrylate. Glycidyl (meth) acrylate is preferably used.

Free-radically polymerizable, olefinically unsaturated monomers which, apart from at least one olefinic double bond, do not contain additional functional groups that can be used to form the acrylic polymer are, for example, esters of unsaturated carboxylic acids with aliphatic monohydric branched or unbranched as well as cyclic alcohols with 1 to 20 carbon atoms. The unsaturated carboxylic acids, which may be considered, are acrylic acid, methacrylic acid, crotonic acid and isocrotonic acid. Esters of (meth)acrylic acid are preferred. Examples of (meth)acrylic acid esters are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of (meth)acrylic acid esters with cyclic alcohols are cyclohexyl acrylate, trimethylcyclohexyl acrylate, 4-tert.-butylcyclohexyl acrylate, isobornyl acrylate and the corresponding methacrylates. Particularly, monomers having inherent low Tg properties are suitable for deriving the low Tg acrylic polymers of this invention. Examples include butyl acrylate (Tg −54° C.), 2-ethylhexyl acrylate (Tg −50° C.), ethyl acrylate (Tg −24° C.), isobutyl acrylate (Tg −24° C.), 2-ethylhexyl methacrylate (−10° C.), and some of the reaction products of long linear or branched alcohols with the olefinically unsaturated monocarboxylic acids. The abovementioned Tg values are derived from literatures and are commonly accepted in the industry. The Tg's of the acrylic polymers can be conveniently predicted using the Fox equation based on Tg's of the monomers. The compositions of the low Tg acrylic polymers of this invention can be formulated using this tool, and the Tg's of the finished polymers can be measured by DSC (Differential Scanning calorimetry, also available as ASTM D3418/E1356).

Further useful unsaturated monomers that do not contain additional functional groups are, for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers are styrene, alpha-methylstyrene, chlorostyrenes, 2,5-dimethylstyrene, p-methoxystyrene, vinyl toluene. Styrene is preferably used.

Small proportions of olefinically polyunsaturated monomers may also be used. These are monomers having at least 2 free-radically polymerizable double bonds per molecule. Examples of these are divinylbenzene, 1,4-butanediol diacrylate, 1,6-hexanediol diacrylate, neopentyl glycol dimethacrylate, glycerol dimethacrylate.

The hydroxyl-functional (meth)acrylic polymers generally are formed by free-radical copolymerization using conventional processes well known to those skilled in the art, for example, bulk, solution or bead polymerization, in particular by free-radical solution polymerization using free-radical initiators.

The acrylic polymer can contain (meth)acrylamides. Typical examples of such acrylic polymers are polymers of (meth)acrylamide and alkyl (meth)acrylates, hydroxy alkyl (meth)acrylates, (meth)acrylic acid and or one of the aforementioned ethylenically unsaturated polymerizable monomers.

The crosslinking agents that can be used in the novel composition of this invention include typical organic polyisocyanates. Examples of organic polyisocyanates include aliphatic polyisocyanates, cycloaliphatic polyisocyanates, aromatic polyisocyanates and isocyanate adducts.

Examples of suitable aliphatic, cycloaliphatic and aromatic polyisocyanates that can be used include the following: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-30 dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

However, applicants have made a surprising discovery that by adding a sag control agent to the coating compositions, applicants were able to not only retain desired coating properties, such as gloss but also desired sag resistance and brushability while still attaining low VOC. Typically, 2 weight percent to 50 weight percent, preferably percent 2 weight percent to 20 weight percent of sag control agent can be added to the coating composition, said weight percentages being based on the total weight of the composition. The sag control agent can be added to the crosslinkable component, crosslinking component, or to the crosslinkable and crosslinking components. Since sag control agent containing drying oils would cross link when exposed to air, there is thus an added benefit of lowering the volatile organic component (VOC) of the solvent borne brushable coating composition of the present invention having desired sag resistance.

The sag control agent invented by the applicants can be prepared by conventionally prepared by polymerizing a mixture comprising one or more amine monomers, one or more isocyanate monomers and a drying oil comprising selected from the group consisting of linseed oil, tung oil, poppy seed oil, perilla oil, walnut oil or a combination thereof. The sag control agent can be added to either the crosslinkable component, crosslinking component, or to both of a novel solvent borne brushable coating composition having improved sag resistance.

Generally, drying oils are added to alkyd paints. As they tend to rapidly crosslink when exposed to air, they are difficult to apply with a brush at low thicknesses typically employed in automotive refines applications. Moreover, drying oils, such as linseed oils, typically extracted from flax seeds are thickened (Stand Oil) to impart better pigment grinding properties and also to reduce drying time. Thus one of ordinary skill in the art would not employ a drying oil for automotive refinish applications in brushable enamel because it tends to be too thick.

Linseed oil is preferred. Linseed oil includes in the range of from 52% to 55% of triply unsaturated α-linolenic acid, about 7% to 8% of palmitic acid 15 and 3% to 5% of stearic acid, all weight percentages based on the total weight of linseed oil. The more preferred linseed oil includes in the range of from 18% to 23% of monounsaturated oleic acid, 14% to 17% doubly unsaturated linoleic acid, all weight percentages based on the total weight of linseed oil. Linseed Oil #QL045 supplied by W. M. Barr & Co., of Memphis, Tenn. is well suited for use in the present invention.

The monomer mixture includes about 0.5 to about 3 weight percent of the amine monomers and about 0.5 to about 3 weight percent of the isocyanate monomers, the weight percentages being based on the total weight of said monomer mixture.

The amine monomer is selected from the group consists of a primary amine, secondary amine, ketimine, aldimine, or a combination thereof. Benzyl amine is preferred.

The isocyanate monomer is selected from the group consists of an aliphatic polyisocyanate, cycloaliphatic polyisocyanate, aromatic polyisocyanate and a combination thereof. The preferred isocyanate monomer is 1,6 hexamethylene diisocyanate.

The sag resistance of a layer from of a pot mix resulting from mixing of the crosslinkable and crosslinking components of the current coating composition when applied over a substrate is in the range of from about 5(127 Micrometers)

to about 20 mils (508 micrometers), as measured under ASTM test D4400-99. The higher the number, the higher will be the desired sag resistance.

Moreover, the layer of the potmix of the coating composition of the present invention also exhibits low brush drag when brush applied over a substrate of from 1 to 3 as measured under ASTM test D4958 employing compositions of the present invention.

The novel composition can contain 1 to 50% by weight, preferably, 20 to 40% by weight, based on the weight of the binder, of acrylic NAD (non-aqueous dispersed) resins. These NAD resins typically are high molecular weight resins having a crosslinked acrylic core with a Tg between 20 to 100° C. and attached to the core are low Tg stabilizer segments. A description of such NAD resins is in Antonelli et al. U.S. Pat. No. 4,591,533, Antonelli et al. U.S. Pat. No. 5,010,140 and in Barsotti et al. U.S. Pat. No. 5,763,528. These patents are hereby incorporated by reference. Clear coating compositions generally do not contain NAD resins.

Typically, a catalyst can be used in the novel composition to reduce curing time and temperature and allow curing of the coating at ambient temperatures. Typical catalysts include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The novel solvent borne composition is free from water or any alcoholic solvents, such methanol, ethanol, butanol, pentol or glycol. The composition can contain up to 95% by weight, based on the weight of the coating composition, of one or more solvents. Typically, the novel composition has a solids content of 20% to 80% by weight, preferably, 50% to 80% by weight and more preferably, 60% to 80% by weight of a ready to brush composition. The novel composition may be formulated at 100% solids by using a low molecular weight acrylic resin reactive diluent.

Some of the typical organic solvents may be used to form the coating composition of this invention. Examples of solvents include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

Typically, when the novel composition is utilized as a pigmented coating composition, it contains pigments in a pigment to binder weight ratio of 1/100 to 350/100. The composition can be used as a primer. Conventional primer pigments can be used in a pigment to binder weight ratio of 150/100 to 350/100. Examples of the primer pigments that are useful in primers can include titanium dioxide, zinc phosphate, iron oxide, carbon black, amorphous silica, high surface area silica, barium sulfate, talc, chromate pigments for corrosion resistance, such as, calcium chromate, strontium chromate, zinc chromate, magnesium chromate, barium chromate and hollow glass spheres. The coating composition can also be used as a base-coat or top-coat coating composition. Conventional inorganic and organic colored pigments, metallic flakes and powders, such as, aluminum flake and aluminum powders; special effects pigments, such as, coated mica flakes, coated aluminum flakes colored pigments can be used usually in combination with one of the aforementioned primer pigments. Transparent pigments or pigments having the same refractive index as the cured binder can also be used. Such transparent pigments can be used in a pigment to binder weight ratio of 0.1/100 to 5/100. One example of such transparent pigment is silica.

The novel coating composition can also comprise ultraviolet light stabilizers, or a combination of ultraviolet light stabilizers in the amount of 0.1% to 10% by weight, based on the weight of the binder. Examples of such stabilizers include ultraviolet light absorbers, screeners, quenchers, and specified hindered amine light stabilizers. An antioxidant also can be added to the coating composition, in the amount of 0.1% to 5% by weight, based on the weight of the binder.

Typical ultraviolet light stabilizers that are suitable for this invention can include benzophenones, triazoles, triazines, benzoates, hindered amines and mixtures thereof. Specific examples of ultraviolet stabilizers are disclosed in Antonelli et al. U.S. Pat. No. 4,591,533, the entire disclosure of which is incorporated herein by reference. For good durability, a blend of Tinuvin® 328 and Tinuvin® 123 (hindered amine light stabilizers), all commercially available from Ciba Specialty Chemicals, Tarrytown, N.Y., under respective registered trademark, is preferred.

Typical ultraviolet light absorbers that are suitable for this invention can include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4, 6-bis(2,4-15 dimethylphenyl)-1,3,5-triazine, 2-[4(2-hydroxy-3-(2-ethylhexyl)-oxy)-2-hydroxyphenyl]-4,6-bis (2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Typical antioxidants that are suitable for this invention can include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. Typically useful hydroperoxide decomposers include Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

Typical hindered amine light stabilizers can include N-(1, 2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1- propanediyl]]bis[N,N'''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl)methyl]butyl propanedioate, 8-acetyl-3-dodecyl-7,7,9,9,-tetramethyl-1,3,8-triazaspiro(4,5)decane-2,4-dione, dodecyl/tetradecyl-3-(2,2,4,4-tetramethyl-21-oxo-7-oxa-3,20-diazal dispiro(5.1.11.2)henicosan-20-yl)propionate.

The coating compositions can comprise conventional coating additives. Examples of such additives can include leveling agents based on (meth)acrylic homopolymers, rheological agents, such as highly disperse silica or polymeric urea compounds, thickeners, such as partially cross-linked polycarboxylic acid or polyurethanes, antifoaming agents, wetting agents, catalysts for the cross-linking reaction of the OH-functional binders, for example, organic metal salts, such as, dibutyltin dilaurate, zinc naphthenate and compounds containing tertiary amino groups, such as, triethylamine, for the cross-linking reaction with polyisocyanates. The additives are used in conventional amounts familiar to the person skilled in the art.

The novel coating composition may also contain other conventional formulation additives, such as, wetting agents, leveling and flow control agents, for example, Resiflow®S (polybutylacrylate), BYK® 320 and 325 (high molecular weight polyacrylates), BYK® 347 (polyether-modified siloxane) under respective registered trademarks, and rheology control agents, such as, fumed silica.

The coating compositions according to the invention may contain further reactive low molecular weight compounds as reactive diluents that are capable of reacting with the cross-linking agent. For example, low molecular weight polyhydroxyl compounds, such as, ethylene glycol, propylene glycol, trimethylolpropane and 1,6-dihydroxyhexane may be used.

Aforedescribed additives with the exception of a catalyst can be added to either the crosslinkable component, crosslinking component, or to both. Catalyst is added to the crosslinkable component.

The novel composition is formulated as a two-pack (2K) coating composition. If polyisocyanates with free isocyanate groups are used as the crosslinking agent, the coating composition is formulated as a two-pack system in that the crosslinkable component (first pack) is mixed with the crosslinking component (second pack) shortly before coating application to form pot mix.

The pigments can be dispersed in the first pack using conventional dispersing techniques, such as, ball milling, sand milling, attritor grinding, and the like. The second pack contains the crosslinking agent, such as, a polyisocyanate crosslinking agent, and solvents.

The brushable coating composition according to the invention is be suitable for vehicle and industrial coating (construction and transportation equipment) and can be applied by using known brushing processes. In the context of vehicle coating, the coating composition can be used both for vehicle original equipment manufacturing (OEM) coating and for repairing or refinishing coatings of vehicles and vehicle parts. Curing of the composition is accomplished at ambient temperatures.

The pot mix of the coating composition can be applied by conventional brushing techniques. Typically, a layer of a pot mix is applied to a dry film thickness of 20 to 300 microns and preferably, 50 to 200 microns, and more preferably, 50 to 130 microns. The layer is cured at ambient temperatures.

The coating composition of this invention forms finishes with good adhesion to the substrates such as blasted steel and other coating layer or layers such as primer layers formed by common industrial primers. Another major advantage of the novel composition of the present invention is that it can be applied direct-to-metal, i.e., a bare uncoated surface of a metallic substrate, while still offering good corrosion resistance and eliminating a need for a primer.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

Testing Procedures

Dry to touch time—Dry to touch time is determined by ASTM D1640.

In the following examples, all parts and percentages are on a weight basis unless otherwise indicated. "Mw" weight average molecular weight and "Mn" means number average molecular weight. "PBW" means parts by weight.

Sag Resistance is measured under ASTM D4400-99.

Brush drag is measured under ASTM D4958-10.

Examples

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Procedure 1

Preparation of Acrylic Polyols

Acrylic polyols were formed by similar free-radical copolymerization as described above with different monomer ratio as described below. Charge to A reactor equipped with a stirrer, reflux condenser and under nitrogen was charged with 13.7 parts t-butylacetate, which was heated to reflux, at approximately 96° C. A monomer mixture of 14.6 parts methyl methacrylate, 5.9 parts styrene, 11.7 parts hydroxyethyl methacrylate, 14.6 parts n-butyl acrylate, 11.7 parts 2-ethylhexyl methacrylate, 1.2 parts t-butylacetate and an initiator mixture of 3.4 parts Vazo®67 (Vazo®67 is available from E.I. DuPont de Nemours and Company, Wilmington, Del., USA, and under respective registered trademark) and 23.2 parts t-butylacetate were prepared. The monomer mixture at reflux was fed over 360 minutes to a reactor simultaneously with the initiator mixture and the initiator mixture was further continued to be fed over 390 minutes. After the initiator mixture feed was complete, the reactants were hold for 60 minutes at reflux and then cooled to room temperature.

The acrylic polyol produced herein had the following characteristics: a calculated Tg of +17.6° C., solids 60%, Gardner-Holdt viscosity Y+1/4, and weight average molecular weight (Mw) of 10,000.

Procedure 2

Preparation of Sag Control Agent

Benzyl amine (available from BASF, Florham Park, N.J.) 1.7% by weight was mixed with 1.34% by weight of 1,6 Hexamethylene Diiscocyanate, in the presence of 96.36% by weight of linseed oil to form a reaction mixture, which was stirred for 5 minutes under the ambient conditions to form the sag control agent of the present invention polyurea in linseed oil.

Procedure 3

Preparation of Comparative Example

Benzyl amine 1.7% by weight was mixed with 1.34% by weight of 1,6 Hexamethylene Diiscocyanate, in the presence of 96.36% by weight of acrylic polymer of Procedure 1 above to form polyurea in acrylic polyol.

Preparation of the Coating Composition 1 of the Present Invention and Comparative Coating Composition 1

Parts by weight of the crosslinking and crosslinking components of the two pack coating composition of the present invention (Example) and comparative coating composition (Comp. Ex. 1) were mixed prior to coating application to form pot mix. The pot mix was brush applied over a bare metal substrate and the results were listed in Table 1 below:

TABLE 1

|  | Comp. Ex. 1 | Example | Comp. Ex. 2 |
|---|---|---|---|
| Crosslinkable | 80 | 80 | 80 |
| Polyurea in | 5 | 0 | 0 |
| Polyurea in | 0 | 5 | 0 |
| Butyl Acetate | 5 | 5 | 10 |
| Crosslinking | 10 | 10 | 10 |
| Test Results |  |  |  |
| VOC in lbs/gal | 3.30 | 3.10 | 3.42 |
|  | (0.395) | (0.371) | (0.410) |
| Sag in Mil3 | 9 | 12 | 4 |
|  | (229) | (305) | (101) |
| Brush Drag4 | 4 | 1 | 3 |
| Gloss5 | 85 | 90 | 90 |
| Dry to touch6 | 3 | 2 | 4 |

1. Polyurethane primer base Imron ® Industrial Strength Low VOC Acrylic polymer 9T01 ™, available from Axalta Coating Systems, Wilmington, USA.
2. Imron ® 9T00A ™ Aliphatic polyurethane resin Activator, available from Axalta Coating Systems, Wilmington, USA.
3. ASTM Test D4400-99.
4. ASTM test D4958.
5. Measured at 60 degrees on a 5 mil thick coating.
6. Measured on a 5 mil thick coating.

From Table 1 one can readily note that the presence of sag control agent in the coating composition, the sag resistance increased, brush drag was reduced, VOC was reduced, dry-to-touch time was reduced while high gloss was maintained. Applicants have made a surprise discovery that only when linseed oil is used, desired coating properties, such as higher gloss and lowered dry to touch time are attained while significantly reducing the brush drag. Applicants' surprising discovery was the increased sag resistance with a reduced brush drag.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A solvent borne brushable coating composition having improved sag resistance, said composition comprising:
    (a) a crosslinkable component comprising a polymer having two or more crosslinkable groups;
    (b) a crosslinking component comprising a crosslinking agent having crosslinking groups; and
    (c) a sag control agent prepared by polymerizing a mixture comprising
    an amine monomer, an isocyanate monomer and a drying oil chosen from linseed oil, tung oil, poppy seed oil, perilla oil, walnut oil or a combination thereof, wherein said mixture comprises from about 0.5 to about 3 weight percent of said amine monomer and from about 0.5 to about 3 weight percent of said isocyanate monomer, wherein said weight percentages are based on the total weight of said mixture;
    wherein said sag control agent is added to said crosslinkable component, said crosslinking component, or to said crosslinkable and crosslinking components.

2. The composition of claim 1 wherein a layer of a pot mix resulting from mixing of said crosslinkable and crosslinking components when applied over a substrate has a sag resistance in the range of from about 5 to about 20 mils (127 to 508 micrometers) under ASTM test D4400-99.

3. The composition of claim 1 wherein a layer of a pot mix resulting from mixing of said crosslinkable and crosslinking components when applied over a substrate has a brush drag in the range of from 1 to 3 under ASTM test D4958.

4. The composition of claim 1 wherein a layer of a pot mix resulting from mixing of said crosslinkable and crosslinking components when applied over a substrate has a sag resistance in the range of from about 5 to about 20 mils (127 to 508 micrometers) under ASTM test D4400-99 and a brush drag in the range of from 1 to 3 under ASTM test D4958.

5. The brushable coating composition of claim 1 wherein said drying oil is linseed oil.

6. The brushable coating composition of claim 5 wherein said linseed oil comprises in the range of from about 52% to about 55% of triply unsaturated α-linolenic acid, about 7% to about 8% of palmitic acid and about 3% to about 5% of stearic acid, all weight percentages based on the total weight of linseed oil.

7. The brushable coating composition of claim 1 wherein said amine monomer is chosen from one comprising a primary amine, a secondary amine, a ketimine, an aldimine, or a combination thereof.

8. The brushable coating composition of claim 1 wherein said amine monomer is benzyl amine.

9. The brushable coating composition of claim 1 wherein said isocyanate monomer is chosen from one comprising an aliphatic polyisocyanate, cycloaliphatic polyisocyanate, aromatic polyisocyanate and a combination thereof.

10. The brushable coating composition of claim 1 wherein said isocyanate monomer comprises 1,6 hexamethylene diisocyanate.

11. The brushable coating composition of claim 1 wherein said polymer comprises hydroxyfunctional (meth)acrylic polymer.

12. The brushable coating composition of claim 11 wherein said polymer has a glass transition temperature (Tg) of in a range of from about −40° C. to about 60° C.

13. The coating composition of claim 1 wherein said crosslinking agent is chosen from one comprising aliphatic polyisocyanate, cycloaliphatic polyisocyanate, aromatic polyisocyanate or a combination thereof.

14. The coating composition of claim 1 wherein a coating upon cure of said layer has a gloss that is in the range of about 5 to about 100 when measured at 60 degree angle.

15. The coating composition of claim 1 comprising one or more organic solvents chosen from one comprising aromatic hydrocarbons, ketones, esters or a combination thereof.

16. The coating composition of claim 1, wherein said crosslinkable component and said crosslinking component are stored in separate containers.

17. The coating composition of claim 16 wherein said separate containers are hermitically sealed to prevent exposure to air while stored.

18. A process for producing a coating on a substrate, the process comprising the steps of:
(a) mixing a crosslinkable component of a solvent borne brushable coating composition having improved sag resistance with a crosslinking component of said composition to form a potmix, wherein said crosslinkable component comprises a polymer having two or more crosslinkable groups and wherein said crosslinking component comprises a crosslinking agent having crosslinking groups; and wherein said composition further comprises a sag control agent prepared by polymerizing a mixture comprising an amine monomer, an isocyanate monomer and a drying oil chosen from one comprising linseed oil, tung oil, poppy seed oil, perilla oil, walnut oil or a combination thereof, wherein said mixture comprises from about 0.5 to about 3 weight percent of said amine monomer and from about 0.5 to about 3 weight percent of said isocyanate monomer, wherein said weight percentages are based on the total weight of said mixture;
(b) brushing a layer of said pot mix over said substrate, wherein said potmix has a sag resistance in the range of from about 5 to about 20 mils (127 to 508 micrometers) under ASTM test D4400-99; and
(c) curing said layer under ambient conditions to form a coating on said substrate.

19. The process of claim 18 wherein said sag agent is added to said crosslinkable component, crosslinking component, or to said crosslinkable and crosslinking components.

* * * * *